March 2, 1943.  J. ROBITSCHEK  2,313,021
CALCULATOR
Filed May 12, 1939
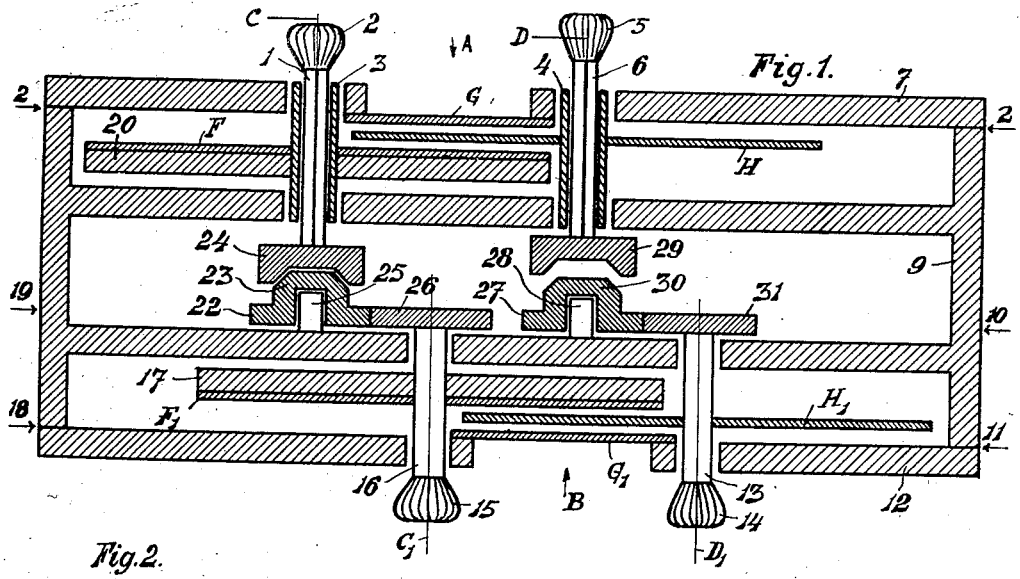
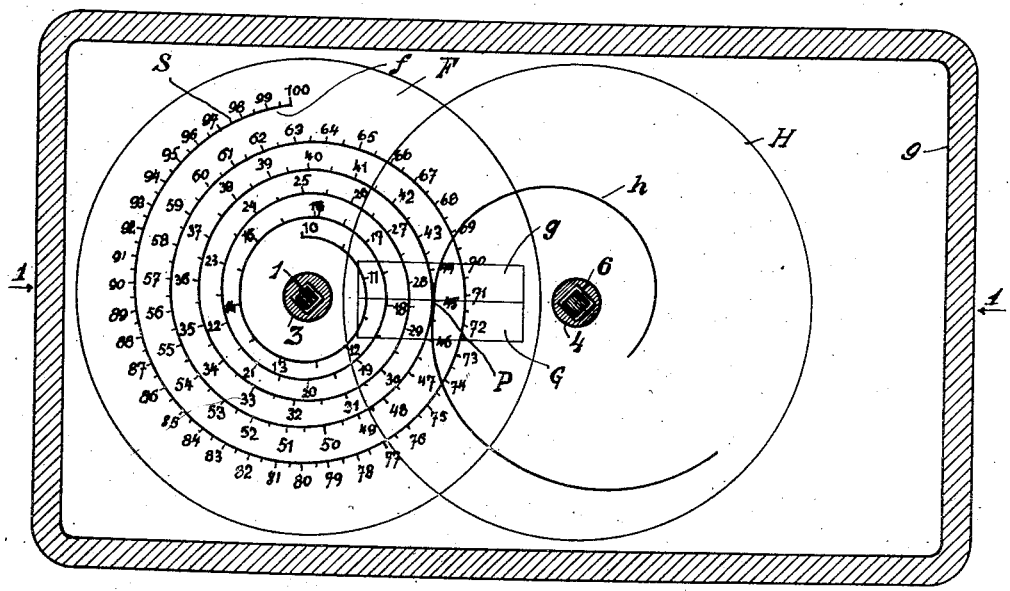
J. Robitschek INVENTOR
BY Thomas Howe
ATTORNEY Patented Mar. 2, 1943

2,313,021

UNITED STATES PATENT OFFICE 2,313,021

CALCULATOR

Jan Robitschek, Chocen, Bohemia; vested in the Alien Property Custodian

Application May 12, 1939, Serial No. 273,194
In Czechoslovakia May 14, 1938

1 Claim. (Cl. 235—67)

This invention relates to that class of calculating machines in which a scale in the form of a spiral, or of another not constantly curved line is carried by a dial, and in which an indicator, formed by the points of intersection of two separately revoluble lines, can be set at any desired reading of the scale.

Most calculators of this sort have scales, that are graduated along constantly curved lines, that is straight lines, circular lines or helical lines (screw lines). Some calculators have scales traced along spirals, because in this case a relatively long scale may be placed on a given space. The difficulty with these calculators is, that pointers or hands, that have the form of lines, mostly radial straight lines, indicate at the same time different readings of the scale, as they cut the spiral generally in more than one point. To avoid this inconvenience, different devices have been made. At some of them it is necessary to make separate calculations or an estimate. Calculating is complicated thereby, and errors are frequent.

The calculator, according to my invention, has a dial with a scale S, which has the form of an inconstantly curved line $f$. Its exact form may be chosen arbitrarily. For most purposes it may be a spiral, such as an arithmetical (Archimedean) spiral, or a logarithmical spiral. Points on this scale may be determined easily and exactly by the points of intersection of two lines $g$ and $h$, that are plotted on the surfaces of disks or of other suitable supports. Conveniently the disks, and/or the dial with the scale S, will be transparent and nearly superposed, so that the scale S and the two lines $g$ and $h$ may be seen at the same time. Of the three lines, viz. the line $f$ with the scale S and the two lines $g$ and $h$, one is fixed and the two other lines are revoluble separately relatively to the fixed line, about one axis C, or about two different axes C and D. The surfaces with the three lines are parallel.

When constructing such a device, an inconstantly curved line $f$ is chosen, for instance a logarithmical spiral, (see Fig. 2). Then a second line $g$ is chosen arbitrarily, for instance a straight line (see Fig. 2). This line $f$ is revoluble, relatively to the line $g$, about an axis C, for instance the centre of the spiral. The line $f$ is brought in an initial position and one of the points of intersection of $g$ with $f$ is chosen as the initial point on the scale S. The scale S is now graduated along $f$, by rotating line $f$ in a chosen direction and by measuring the angle of rotation. The succeeding points of intersection of $f$ and $g$ determine on $f$ the values of the scale S, according to the angle of rotation of $f$. If a logarithmical scale shall be graduated on $f$, there appertains to the point of intersection of $g$ and $f$ such number of the scale S as corresponds to the logarithm determined by the angle of rotation of $f$. Such a scale S on $f$ is graduated by several rotations of $f$, every rotation serving for graduating one turn of the spiral $f$. This way of graduating the scale is known from other inventions.

For the indicator that shall determine values of scale S, it is necessary to select another line $h$, that shall be revoluble.

This line $h$ may be revoluble about an axis D (Fig. 2), and it may be revoluble relatively to line $f$ with the scale S if the scale S is fixed and line $g$ movable or revoluble relatively to line $g$ if line $g$ is fixed and scale S movable, which may be chosen arbitrarily. It may be chosen, that the line $g$ is fixed, the scale S with the line $f$ being revoluble about the axis C and the line $h$ being revoluble about another axis D (Fig. 2). The form of the line $h$ now cannot be chosen arbitrarily. If additions of angular values shall be possible along scale S, it is necessary that also the corresponding angular turning movements of lines $g$ and $h$ be additive. That is if the point of intersection P of lines $f$ and $h$ is put on a point $P_0$ of line $g$ and then on another point $P_1$ of line $g$ by turning $f$ by an angle $a_1$ and $h$ by an angle $b_1$, and if $f$ and $h$ are again put on the point $P_0$ and turned by angles $a_2$ and $b_2$ so that they cross on another point $P_2$ of $g$, then there shall be the condition, that if turning $f$ and $h$ from the position $P_0$ by angles $a_3=a_1+a_2$ and $b_3=b_1+b_2$, the new point of intersection $P_3$ of $f$ and $h$ be also a point of line $g$. Only if this condition is fulfilled, is it possible to use the calculator for the desired purpose. This condition is fulfilled always, when the fixed line is the locus of the points of intersection of the two revoluble lines, when they are turned simultaneously by equal angles ($a=b$), or by proportional angles ($a=Kb$), K being a real factor of proportions, that may be chosen arbitrarily. Only if the axes C and D are coincident, K shall not be 1, because the locus would be a circle about C, only. To provide the truth of the proposition, it is only necessary to show that $$a_3=a_1+a_2=Kb_1+Kb_2=K(b_1+b_2)=Kb_3$$

That is, if $P_1$ (angles $a_1=Kb_1$) and $P_2$ (angles $a_2=Kb_2$) are points of line $g$, then also $P_3$ (angles $a_3=Kb_3$) is a point of line $g$.

Lines $f$ and $g$ may be represented by the functions $\phi=f(r)$ and $\phi=g(r)$ of the polar coordinates $\phi$ and $r$ of pole C. Lines $g$ and $h$ may be represented by the functions $\phi'=g'(r')$ and $\phi'=h'(r')$ of the polar coordinates $\phi'$ and $r'$ of another coordinate system of pole D. The straight line connecting C and D is $\phi=\phi'=0$. The condition, mentioned above, corresponds then to an equation $$h'(r')-g'(r')=K(f(r)-g(r))$$

Therefrom are resulting these equations:

(a)
$$f(r)=\frac{1}{K}h'(r')+g(r)-\frac{1}{K}\text{ arc tang }\frac{r\sin g(r)}{r\cos g(r)-L}$$

(b)
$$h'(r')=Kf(r)+g'(r')-K\text{ arc tang }\frac{r'\sin g'(r')}{r'\cos g'(r')+L}$$

L is the distance between poles C and D. If $L=0$, the equation will be:

(c) $$h(r)=Kf(r)+(1-K)g(r)$$

K corresponds to the ratio of turning, mentioned above, and is a real constant, which is neither zero nor infinite. If $L=0$, K is neither one.

Suitably, the form of the three lines $f$, $g$, $h$ is chosen so that the point of intersection P of the two lines $g$ and $h$ may be put on every point of the scale S. If the value at the beginning and at the end of the scale S is the same, as usually with logarithmical scales, the three lines $f$, $g$, $h$ will have preferably such a form that the point of intersection P passes over from the beginning to the end of scale S, when continually turning $g$ and $h$. By this it is possible to calculate "over the ends of the scale," as if it were endless.

Calculators, that are constructed in this way, have scales S along variably curved lines $f$, that may be chosen arbitrarily in wide ranges, for a set purpose, and indicators formed by the points of intersection P of lines $g$ and $h$. Every point of the scale S may be determined exactly by two turning movements, and calculations may be possible, as if the scale S were endless. These advantages may counterbalance in many cases the somewhat more complicated technical arrangement of the calculator.

In the accompanying drawing which illustrates the invention:

Fig. 1 shows a calculator embodying the invention in a cross section on the line 1—1 of Fig. 2;

Fig. 2 is a cross section on the line 2—2 of Fig. 1.

In a case 9 with covers 7 and 12 there is a hollow shaft 3 revoluble about an axis C. On this shaft 3 is a disk 20, which has in its upper surface F a spiral line $f$, with a logarithmical scale S with values graduated from 10 to 100. $f$ is a logarithmical spiral $\phi=f(r)=M\log r$. On another hollow shaft 4, revoluble about the axis D, is a thin transparent disk H, which is parallel and nearly superposed to F, and covers it partly. On the disk H is plotted a line $h$, that is also a logarithmic spiral $\phi'=h'(r')=N\log r'$. Parallel and nearly superposed to F and H there is a third transparent surface G, with a straight line $g$, that has the direction CD, $\phi'=g'(r')=0$. The form of $h$ is determined by the form of $f$ and $g$ by the equation b. The points of intersection P of lines $g$ and $h$ are the indicator for values of scale S. The scale S and lines $g$ and $h$ are to be observed in the direction A. In the lower part of the case 9 is a similar device with a stem 15 and a shaft 16, that is revoluble about the axis $C_1$, a disk 17, that is on shaft 16, and that has on its lower surface $F_1$ a similar scale S, along a line $f$. On the shaft 13, that is revoluble about its axis $D_1$, there is a thin transparent disk $H_1$ with a line $h$. In the fixed surface $G_1$ there is a straight line $g$ in the direction $C_1D_1$. This scale S and the lines $g$ and $h$, appertaining to it, are to be observed from B. The shafts 3 and 4 in the upper device are hollow, the cross section being a square (Fig. 2). Within the shafts 3 and 4 there are square shafts 1 and 6, that are revoluble by means of stems 2 and 5 together with the shafts 3 and 4, and that may be shifted up and down. These shafts 1 and 6 have on their lower ends headpieces 24 and 29, which form clutches together with the corresponding opposite headpieces of gears 22 and 27. In Fig. 1 clutch 23, 24 is coupled and clutch 29, 30 is disconnected. By these clutches and the gears 22, 26 and 27 the disks 20 and 17 may be turned simultaneously by equal angles or each one separately and the disks H and $H_1$ may be turned simultaneously by equal angles or each one separately.

On the device as shown in Figs. 1 and 2, a multiplication XY=W will be calculated in this way. The surface F with the scale S and the surface H with the line $h$ and $F_1$ and $H_1$ are turned by the stems 2, 5, 14, 15 into the initial position, clutches 23, 24 and 29, 30 being uncoupled. In the initial position the readings 10 and 100 of the scale are on line $g$ as well as the final points of line $h$. Then, clutches 23, 24 and 29, 30 being coupled, the point of intersection P of lines $g$ and $h$ in the upper part of the device is set on the reading X, by turning F and H by means of the stems 2 and 5. On the other scale S and $F_1$ the same value X is automatically determined. If $X=45$ the position of S, $g$ and $h$ will be, as shown in Fig. 2. Now the clutches are disengaged and the upper scale S on F and line $h$ on H are put in the initial position. The clutches coupled again, the reading Y is determined on the upper scale S on F. The point of intersection of $g$ and $h$ on the lower scale S, observed from B, then determines such reading of the scale S as corresponds to the value of W.

What I claim is:

In a calculator a combination of three lines ($f$, $g$, $h$), being in superposed and parallel surfaces (F, G, H) and on suitable supports, and one of the lines ($f$) bearing a scale (S), the other two ($g$, $h$) forming together by their points of intersection the indicator for values of the scale (S), two of the lines being revoluble, relatively to the third line about two different axes (C, D), which are perpendicular to the surfaces (F, G, H), and the form of the third line being determined by the condition, that it is the locus of the points of intersection of the two revoluble lines, when they rotate simultaneously by proportional or by equal angles, and the line ($f$), which is provided with the scale (S), being inconstantly curved, and the scale (S) being graduated along this line ($f$) according to the angle of rotation of one of the other two lines, relatively to this line ($f$), so that to each point of intersection appertains such quantity or value of the scale (S), as corresponds to the angle of rotation from a starting position.

JAN ROBITSCHEK.